United States Patent [19]

Motomura

[11] 4,072,417

[45] Feb. 7, 1978

[54] EXPOSURE DEVICE FOR A XEROGRAPHIC COPYING MACHINE

[75] Inventor: Koichi Motomura, Ebina, Japan

[73] Assignee: Rank Xerox Ltd., London, England

[21] Appl. No.: 722,941

[22] Filed: Sept. 13, 1976

[51] Int. Cl.[2] .......... G03B 27/54

[52] U.S. Cl. .......... 355/67

[58] Field of Search .......... 355/8, 11, 67, 68

[56] References Cited

U.S. PATENT DOCUMENTS

| | | | |
|---|---|---|---|
| 3,432,232 | 3/1969 | Tompkins | 355/11 X |
| 3,698,815 | 10/1972 | Thomas | 355/8 X |
| 3,779,640 | 12/1973 | Kidd | 355/67 X |
| 3,784,304 | 1/1974 | Babin et al. | 355/67 |

*Primary Examiner*—Donald A. Griffin
*Attorney, Agent, or Firm*—Earl T. Reichert

[57] ABSTRACT

An exposure device for a copying machine has a light source unit, and a rail unit for supporting the former rigidly mounted to the machine. The light source unit includes an exposure lamp, a heater for heating the lamp, and a control sensor for energizing the heater until the lamp reaches a proper temperature. The rail unit includes a plate having an elongated exposure aperture therein, an elongated reflecting mirror along one side of the aperture, and a guide rail spaced from the plate along the other side of the apertue. A particular positional relationship must be maintained between the optical system and photoreceptor of a copying machine, the exposure lamp, and the exposure aperture. The present invention allows the light source to be mounted to and dismounted from the machine without disturbing this relationship. This is effected by providing (1) a projection on the light source unit which extends through the space between the plate and guide rail as the light source unit is slid along the plate and guide rail to limit the lateral movement of the light source unit, and (2) a spring which serves to stop the light unit when it reaches the proper position and to bias it into contact with the plate and guide rail.

2 Claims, 3 Drawing Figures

EXPOSURE DEVICE FOR A XEROGRAPHIC COPYING MACHINE

BACKGROUND OF THE INVENTION

The present invention relates to an exposure device for a xerographic copying machine.

Conventionally, in a xerographic copying machine employing electrophotographic light sensitive material, the exposure lamp, the exposure slit, the optical system, and the light sensitive material are mounted in the copying machine individually and independently from each other. The relative positional relationship between these components is adjusted after mounting each of the components. Therefore, the conventional copying machine has heretofore involved complicated manual adjustments, and this has been particularly true with regard to any component requiring periodical or frequent replacement such as the exposure lamp. When an exposure lamp is to be replaced with a new one, for example, a cover of the copying maching is first removed, and then electric sockets are removed out of the exposure lamp to extract the lamp. When the housing for the exposure lamp is to be removed, the original document platen must be further dismounted. All these procedures have been quite troublesome.

The above disadvantages occur because each component of the exposure system is mounted individually in the copying machine, and because each component is not specifically designed for easy and quick replacement.

SUMMARY OF THE INVENTION

The present invention is intended to eliminate the above disadvantages inherent to a conventional exposure system. Therefore, it is an object of the present invention to provide a novel exposure device for use in a xerographic copying machine, in which device the exposure lamp and auxiliary components are assembled integrally into a single unit which can be readily mounted to and dismounted from the copying machine whereby the path of light rays after replacement of the unit is automatically brought into registration with a predetermined path without any additional adjustment.

Another object of the invention is to provide an exposure device for use in a xerographic copying machine, which device includes a supplementary heater for heating the exposure lamp to supplement any insufficient radiation intensity of the lamp while the latter is at a low temperature condition, and a control sensor for energizing the heater until the exposure lamp attains a proper temperature.

DETAILED DESCRIPTION OF THE INVENTION

Figure 1:
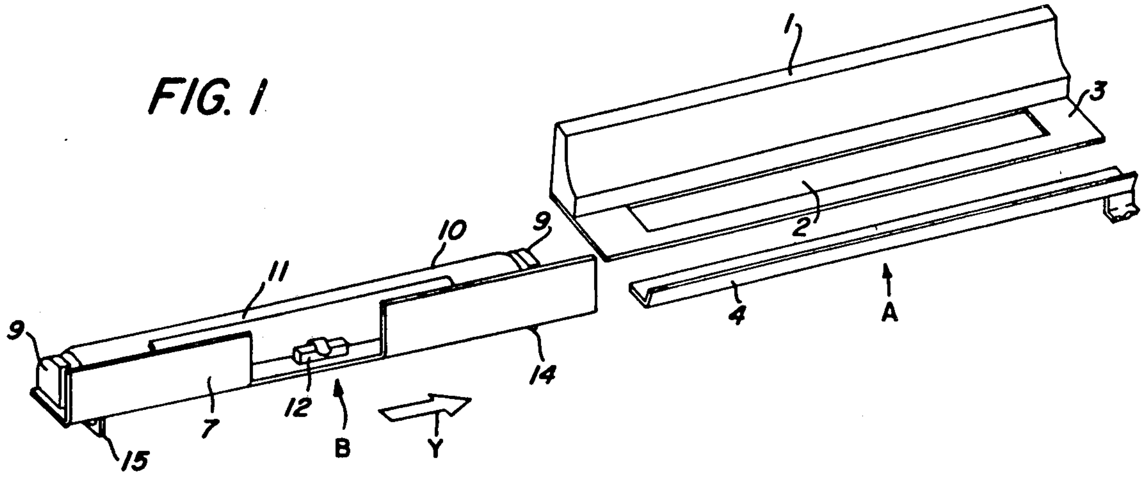
FIG. 1 is an exploded and partly broken away perspective view of the preferred embodiment of the invention.
Figure 2:
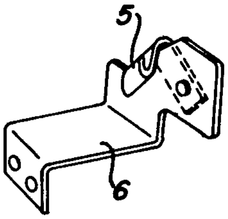
FIG. 2 is a perspective view of a bracket used in the present invention.
Figure 3:
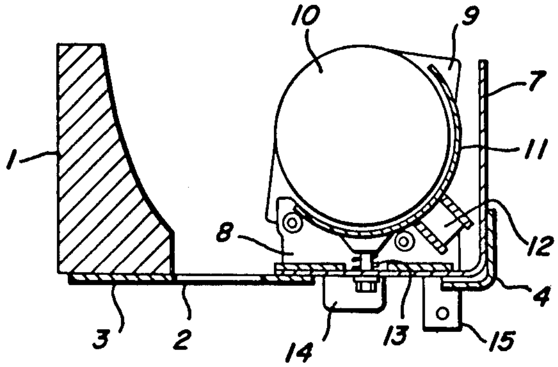
FIG. 3 is a transverse sectional view of the preferred embodiment of the invention.

The exposure device shown in FIG. 1 includes a rail unit A and a light source unit B. The rail unit A has a reflecting mirror 1, a plate 3 provided with an elongated aperture 2 forming the path for the light rays, a guide rail 4 positioned in face-to-face relationship with the reflecting mirror, and a bracket 6 (FIG. 2) located at one end of the guide rail 4 and provided with a leaf spring 5 forming a stopper means. The rail unit A is rigidly mounted to a copying machine (not shown). As shown in FIGS. 1 and 3, the light source unit B includes a housing 7 having an L-shaped section on which is attached sockets 9 by means of brackets 8. An illuminating lamp 10 is supported between the sockets 9. A supplementary heater 11 and a control sensor element 12 for controlling the heater are secured (swingably with respect to the exposure lamp 10) to the housing 7 by means of a support 13. A projection or stopper 14 is provided at one end of the housing 7 for guiding the unit during mounting and dismounting operations. Another stopper means 15 is secured to the opposite end of the housing for positioning the unit at the time of replacement.

With the units arranged as shown, the light source unit B is mounted on the rail unit A according to the following sequence. First, the light source unit B is moved in the direction of an arrow Y as shown in FIG. 1 so as to bring the leading end of the housing 7 of the light source unit B to rest upon an end of the guide rail 4 and plate 3. As the light source is slid along the plate 3 and guide rail 4, the light source is guided by the projection 14 to limit the lateral movement of the unit B between the guide rail 4 and the plate 3 until the leading end of the housing 7 reaches at the leaf spring 5 which presses the housing against the guide rail 4. Thus, the leading end of the light source unit B is made immovable in both vertical and lateral directions, i.e., the movement thereof in these directions is limited. The eventual position of the light source unit B may be limited by the stopper 15 which abuts against a side flange of the copying machine. The stopper 15 is finally secured to the side flange of the main body of the copying machine by any suitable fastening means such as screws. Mounting of the light source unit B to the machine is thus completed. To replace the light source unit, the screws are loosened and removed, and the unit is taken out.

Thus, the light source unit B may be easily removed from and returned to its predetermined operative position by means of the rail unit A. In addition, no particular adjustment of the light ray path is required after insertion of the light source unit. Also, since the supplementary heater 11 (for ensuring the proper function of the exposure lamp 10) and the control sensor element 12 are mounted integrally to the housing 7, the manipulations required for mounting and dismounting the light source unit are greatly simplified.

While the invention has been described with reference to the structure disclosed, it is not confined to the details set forth, but is intended to cover such modifications or changes as may come within the scope of the following claims.

What is claimed is:

1. An exposure device for a xerographic copying machine comprising:

(a) a rail unit adapted to be rigidly mounted to the copying machine, the rail unit having supporting means, means defining an elongated exposure aperture, and an elongated reflecting mirror located along one elongated side of the exposure aperture, (b) a light source unit having a housing adapted to be slid along and supported by the supporting means, and an elongated exposure lamp mounted on the housing, and (c) means for guiding the exposure lamp along the other elongated side of the exposure aperture and for limiting the movement of the housing in a direction transverse to the direction the housing is to be slid, and means for stopping the housing in a predetermined position alongside the exposure aperture and for biasing the housing against the supporting means.

2. An exposure device as set forth in claim 1, wherein the light source unit also includes a heater located adjacent the exposure lamp for heating the latter, and a sensor for energizing the heater until the exposure lamp reaches a predetermined temperature.

* * * * *